United States Patent [19]

Frutschi

[11] Patent Number: 4,630,436
[45] Date of Patent: Dec. 23, 1986

[54] AIR STORAGE GAS TURBINE POWER STATION WITH FLUIDIZED BED FIRING

[75] Inventor: Hansulrich Frutschi, Riniken, Switzerland

[73] Assignee: BBC Brown, Boveri & Company, Limited, Baden, Switzerland

[21] Appl. No.: 753,913

[22] Filed: Jul. 11, 1985

[30] Foreign Application Priority Data

Jul. 30, 1984 [DE] Fed. Rep. of Germany ....... 3428041

[51] Int. Cl.⁴ .............................................. F02C 3/26
[52] U.S. Cl. ............................ 60/39.183; 60/39.464; 60/727
[58] Field of Search ............... 60/39.183, 39.464, 727; 110/263, 347; 122/4 D; 431/7, 170

[56] References Cited

U.S. PATENT DOCUMENTS

| | | | |
|---|---|---|---|
| 3,866,058 | 2/1975 | Lenssen | 60/727 |
| 3,869,862 | 3/1975 | Dickey | 60/39.183 |
| 4,306,411 | 12/1981 | Zoll | 60/39.464 |
| 4,441,028 | 4/1984 | Lundberg | 60/39.182 |
| 4,522,024 | 6/1985 | Zaugg | 60/727 |
| 4,523,432 | 6/1985 | Frutschi | 60/727 |

FOREIGN PATENT DOCUMENTS 3411444 3/1984 Fed. Rep. of Germany .

OTHER PUBLICATIONS

U.S.-ASME Paper 80-GT-160; Mar. 1980.
Tech. Rundschau Sulzer, Bd. 63; Apr. 1981.

*Primary Examiner*—Louis J. Casaregola
*Attorney, Agent, or Firm*—Burns, Doane, Swecker & Mathis

[57] ABSTRACT

The compressor of the coal-fired air storage gas turbine power station is connected by a main air duct to a fluidized bed combustion chamber and an air storage cavern. There is one clutch in each case respectively between the compressor and the electrical machine and between the latter and the turbine. In order to maintain the fluidized bed firing even in the case of pure pumping operations, a low load air duct with a shut-off unit is provided, the low load air duct connecting a pressure stage of the compressor to the main air duct at a position before the fluidized bed combustion chamber. During pumping operations, the fluidized bed continues to be fired at low load by closing a throttle unit in the section of the main air duct leading to the fluidized bed combustion chamber with simultaneously open shutoff units respectively in the section of the main air duct leading to the air storage cavern and in the low load air duct. The combustion gases generated in the fluidized bed combustion chamber drive the turbine which, by means of the clutch designed as an overrunning clutch, supports the electrical machine, operating as a motor, in driving the compressor.

3 Claims, 3 Drawing Figures

AIR STORAGE GAS TURBINE POWER STATION WITH FLUIDIZED BED FIRING

FIELD OF INVENTION

The present invention relates to air storage gas turbine power stations and more particularly, to air storage gas turbine power stations having fluidized bed firing.

BACKGROUND OF THE INVENTION

In conventional air storage gas turbine power stations, disengaging clutches are provided at the connections between the shafts of a compressor, an electrical machine (which can be operated either as a generator or as a motor) and a gas turbine. Because of these clutches, two or all three parts of the installation can be coupled together, depending upon the selection of the type of operation. It is, for example, possible to connect the electrical machine (operated as a motor) to the compressor so to drive the latter, and to store the compressed air generated by the compressor in a reservoir, for example in a subterranean cavern. It is then also possible to supply the turbine, when the need arises, with combustion air for generating combustion gas, while the turbine is connected to the electrical machine operating as a generator, in order to generate electricity. Because it is not then necessary for the turbine to drive the compressor, the maximum turbine power can be utilised in this manner for generating electricity. This type of circuit provides minimum specific investment costs.

It is, of course, also possible to connect all three parts of the installation together, i.e. to drive the compressor and the generator by the turbine without extracting air from the cavern, hence using the complete machine set as a gas turbine group. This manner of operation does, however, require the compressor and the turbine to be designed for the same mass flow. This requirement is not necessarily a requirement for exclusively storage operation, however, because another distribution may be optimum.

The way in which such an installation can be connected in mixed gas turbine and storage operation is described in the German patent application No. P 34 11 444.0 of Mar. 28, 1984. In this arrangement, the air supply from the compressor to the combustion chamber of the gas turbine is throttled. Accordingly the combustion gas flow for the turbine is also throttled. When the installation operates at part-load, the surplus pressurised airflow supplied by the compressor is stored in the cavern. In such an installation, the generator output can be substantially increased beyond that obtainable with normal gas turbine operation by reducing the output of the compressor by, for example, guide vane adjustment or by disconnecting the compressor and extracting compressed air exclusively from the storage cavern.

In such air storage gas turbine power stations, the change from storage operations to electricity generation is rapid, involves few problems and is associated with low losses. The installation can be rapidly started from cold within a few minutes by cranking the shaft and igniting the combustion chamber.

In coal-fired air storage gas turbine power stations, which are now becoming increasingly important, the conditions are not so favorable, particularly with installations in which the coal is burnt in supercharged fluidized bed firing systems. Such fluidized bed firing systems are extremely suitable for firing coal, because they allow the sulphur content to be easily fixed by the addition of limestone and, due to the relatively low combustion temperature in the fluidized bed, they produce fewer oxides of nitrogen and their ash does not melt. For this reason, there are no slag particles (which have a particularly erosive effect on the turbine blading) in the ash particles still present after filtration of the exhaust gas. Accordingly, the fluidized bed firing system substantially increase the operational life of the turbines.

OBJECT AND SUMMARY OF THE INVENTION

The present invention has as an object of producing an air storage gas turbine power station with a fluidised bed firing system, which has a device, by means of which the thermal loads and losses occurring during starting and stopping are reduced compared in comparison with conventional installations, and which permits a higher rate of loading when switching over from air compression operation to electricity generation, it being possible to maintain the fluidised bed firing in an economic manner during air compression operations and other operational pauses of at least fairly short duration.

These and other objects are achieved by an air storage gas turbine power station in accordance with the present invention, which includes a fluidized bed combustion chamber, an air storage chamber, a compressor, a main air duct communicating the compressor and the air storage chamber with each other and the fluidized bed combustion chamber, a throttle at a location along the main air duct, a low load air duct communicating a tap on the compressor with a section of the main air duct between a throttle unit and the fluidized bed combustion chamber and a shut-off valve for opening and closing the low load air duct. The arrangement prevents the fluidized bed from collapsing when the power station is rapidly switched from one mode of operation to another.

BRIEF DESCRIPTION OF THE DRAWING

The present invention is described below in more detail with reference to the preferred embodiments shown in the drawing. In the drawing:

FIG. 1, a preferred embodiment of the present invention includes an installation having a compressor 1, a turbine 2 and according to an electrical machine 3 (which can be operated as motor or generator) of a gas turbine group with air storage. The shafts of these three components can be brought into and out of drive connection by operation of the clutches 4 and 5 in order, in known manner, to permit operation of the installation as a gas turbine with an electricity generator 3, in storage charging operation with the compressor 1 as the sole supplier of air, the turbine 2 being disconnected and at rest and the electrical machine operated as a motor and connected to the compressor, and as a gas turbine supplied exclusively from the air storage cavern 6 with the generator 3 connected and the compressor 1 disconnected. In addition, there is the possibility of mixed gas turbine and storage operation mentioned in the introduction, wherein the turbine 2 operates at partial load and the compressor 1 pumps air into the storage cavern 6.

Figure 1:
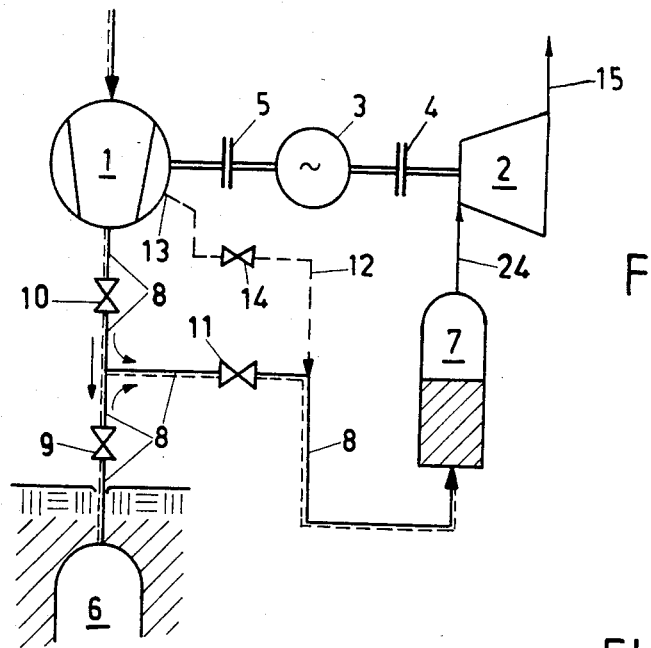
FIG. 1 is a diagram of an air storage gas turbine power station, in accordance with a first preferred embodiment of the present invention.

The compressor 1 is connected to the storage cavern 6 and to a fluidized bed combustion chamber 7 by a main air duct 8 which has two shut-off valves 9 and 10 and a throttle valve 11.

A branch duct emerges from the main air duct, at a location between the shut-off valve 10 (after the compressor 1) and the shut-off unit 9 (before the storage cavern 6). The branch duct leads into the fluidized bed combustion chamber and includes the throttle unit 11.

Up to this point of the description, the installation corresponds to the known state of the art. The preferred embodiment of the present invention also includes a low load air duct 12, which extracts air at an intermediate pressure from a tapping position 13 on the compressor 1 and a shut-off valve 14 in the low load air duct. The overall arrangement serves to maintain the firing of the fluidized bed with a minimum consumption of fuel, the turbine power being correspondingly reduced.

When the installation generates electricity by operation from storage with air extraction exclusively from the storage cavern 6, the compressor is brought to rest by disengaging the clutch 5 and closing the shut-off units 10 and 14. The shut-off unit 9 and the throttle unit 11 are opened and the storage air passes via the open branches of the main air duct 8 into the fluidized bed combustion chamber 7, whose hot combustion gases are led into the turbine for the production of power, expanded and subsequently removed through the exhaust gas duct 15. In this arrangement, the turbine has only to drive the generator 3, which supplies electrical power to the grid. In this type of operation, the turbine power is controlled by the throttle unit 11. Throttling reduces the pressure in the combustion chamber 7 and before the inlet to the turbine. The fluidization conditions in the fluidized bed—and hence the height of the bed—do, however, remain substantially constant if the bed is operated with a mass (approximately 99% of which is made up of non-combustible ash) kept proportional to the pressure in the fluidized bed by partial removal of the ash into an ash buffer (not shown) to suit the degree of throttling. It is therefore possible to control the thermal output at almost constant temperature by the pressure level alone, i.e. the thermal output changes almost in proportion to the pressure.

When changing from this power operation to pump operation, the compressor is connected to the electrical machine 3, operated as a motor, and run up. With the shut-off units 9 and 10 open, it supplies compressed air into the storage cavern 6 via the main air duct 8. So that the pumping operation can be carried out using cheap surplus electrical energy only, air supply to the fluidised bed combustion chamber 7 is prevented by closing the throttle unit 11 and disconnecting the turbine from the motor 3 and brought to rest. Without the present invention, the fluidized bed would then, however, collapse and would not be available for rapid switching to either the full load operation described above, in which the fluidized bed combustion chamber is supercharged to a high pressure, or for pure gas turbine operation.

Using the low load air duct 12, however, it is now possible to continue to fire the fluidized bed at a low pressure level and a correspondingly low coal consumption, approximately 10% of the nominal consumption. The airflow necessary for this purpose is obtained, with the shut-off unit 14 open, by tapping from the compressor 1 at a position 13, at which—without any substantial throttling—the intermediate pressure is just sufficient to maintain a usable fluidized bed. The fuel energy necessary for this purpose is converted, at an acceptable efficiency, in the turbine (which is equipped to deal effectively with even small combustion gas flows by appropriate means such as adjustable guide vanes or the like) into additional compressor pumping work by connecting the turbine to the motor 3. This result is economically achieved with only small additional fuel costs, ignoring the relatively small investment costs for the low load device. Regarding to the specific pumping work, these costs are not substantially higher than the costs for the cheap pumping electricity.

The clutch 4 between the turbine and the generator/motor would be superfluous for continuous operation in this manner. It is, however, economically advantageous because it permits the firing to be shut down and the turbine brought to rest by disengaging the clutch 4 and closing the low load supply during long periods of pumping operation, for example at week-ends.

Figure 2:
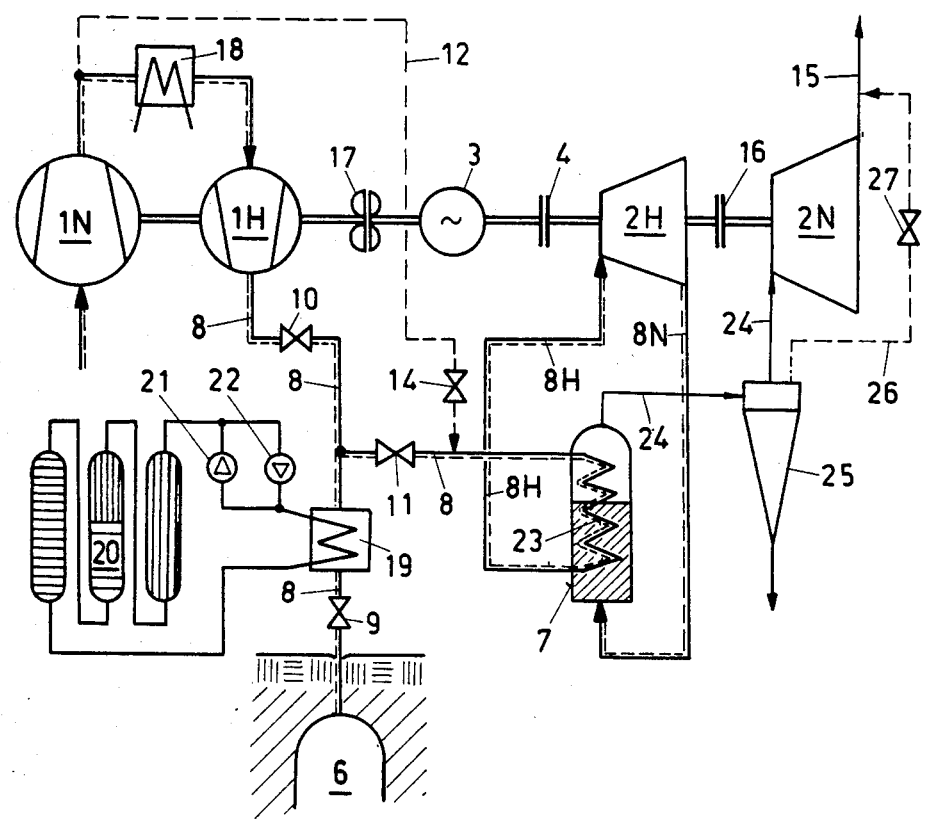
FIG. 2 is a layout of a second preferred embodiment of the present invention.

The principle and the capabilities of an air storage gas turbine power station with continuous fluidised bed firing in accordance with the invention have been described above using the arrangement of FIG. 1. FIG. 2 shows another arrangement of such a power station installation which also has auxiliary equipment for heat recovery, combustion gas cleaning and the synchronisation of the electrical machine 3. Such equipment provides practical and economical operation. Where the elements in this layout are similar to those of FIG. 1, they are allocated the same reference numbers.

In the preferred embodiment of FIG. 2, the compressor and turbine are each in two stages. The low pressure stages are indicated by 1N and 2N and the high pressure ranges by 1H and 2H. The clutch 16 between the two turbine stages 2H and 2N makes it possible to operate them either in common or independently from one another. In this installation, the clutch 5 of FIG. 1 between the generator/motor 3 and the high pressure compressor stage 1H is replaced by a hydraulic torque convertor 17 which can easily convert to high speeds and can be mechanically locked. When converting from the "electricity generation using storage air" type of operation, during which the compressor is disconnected, to pure storage operation or gas turbine operation, this arrangement makes it possible to bring the compressor 1N+1H from rest to the nominal rotational speed. During such time, the compressor is run up with the shut-off unit 10 closed and the compressor blowing off so as to greatly reduce the power absorption. The compressor is then synchronized with and rigidly connected to the shaft of the generator 3 by mechanical locking of the torque convertor. The storage air supply to the turbine can then be interrupted and the turbine operated from the low load air duct 12 in the case of pure storage operation or by air supplied directly from the compressor 1N+1H (with the shut-off unit 9 closed and the throttle unit 11 open) in the case of gas turbine operation. This procedure permits a relatively rapid transition from storage operation to the other types of operation.

Without such a torque convertor, the transition would last much longer. In such case, the electrical machine with the turbine connected would first have to be slowed down to about the barring speed by shutting off the storage air. At this speed, the compressor would be rigidly connected by means of the clutch and the whole group would then have to be run up with storage air to the generator synchronising speed. After the generator had been connected in parallel with the grid, the storage air supply would be switched off. Because of the necessity of bringing the turbine stages to rest, this would involve collapse of the fluidised bed. Low load operation would not, therefore, be feasible without a torque convertor.

An intercooler 18 between the compressor stages 1N and 1H reduces the power consumption of the latter. The air is compressed in the low pressure stage 1N before the intercooler to a pressure suitable for appropriately low load operation, i.e. to about 3-4 bar. The further compression to the storage pressure, for example 40 bar, takes place without any further intercooling. However, in order to achieve the highest possible storage air density, giving the best possible utilisation of the expensive cavern volume, the compression heat of the air is utilised for preheating the air flowing from the reservoir into the firing system, this occurring in a counterflow heat exchanger 19. The heat rejected to the heat exchanger is fed into a hot water reservoir 20 by pumping the water content in an anti-clockwise direction with a pump 21. When air is extracted from the storage cavern for operating the turbine, the air is preheated again by circulating the water in the clockwise direction with a second the pump 22. The device made up by the elements 19-22 thus constitutes a regenerator. The horizontal shading in FIG. 2 represents cold water and the vertical shading indicates hot water.

While, for economic reasons, the storage pressure in the cavern should be high, for example 40 bar, the pressure level suitable for the fluidized bed combustion chamber is, for constructional and strength reasons, substantially lower—for example approximately 10 bar. The heat rejection in the fluidized bed combustion chamber to the high pressure and the low pressure turbine stages 2H and 2N, respectively, therefore occurs separately. Pure air, which is heated in a heater tube bundle 23 and is fed through the hot air duct 8H of the stage 2H, flows through the high pressure turbine stage 2H whereas the combustion gas generated in the fluidised bed is expanded in the low pressure turbine stage 2N. The hot air expanded in the high pressure turbine stage 2H is fed through a low pressure hot air duct 8N to burn the coal in the fluidised bed combustion chamber 7 to generate the combustion gases for the turbine stage 2N. These pass through a combustion gas duct 24, initially into a separator cyclone 25 where the ash particles are substantially separated, before they enter the low pressure turbine stage 2N.

To enable firing to be continued in the fluidized bed during short term storage operation, part of the low pressure air is branched off through the low load air duct 12 behind the low pressure compressor stage 1N, with the shut-off unit 11 closed and the shut-off units 9 and 10 open, into the part of the main air duct 8 located in front of the heater tube bundle 23. The low load air branched off in this manner amounts to about 10% of the flow of the low pressure compressor stage 1N, while the major part of the flow, i.e. approximately 90%, passes via the intercooler 18 and the high pressure compressor stage 1H into the storage cavern 6. By this means, the pressure at entry to the high pressure turbine stage is reduced by a factor of approximately 10, e.g. from 40 to 4 bar, so that at constant pressure ratio and hence constant internal turbine efficiency of the high pressure turbine stage 2H, there is a pressure of somewhat above 1 bar in the fluidised bed combustion chamber. The low pressure turbine stage 2N does not participate in low load operation. It is brought to rest by disengaging the clutch 16 between the two turbine stages and by letting the combustion gases from the combustion chamber 7 escape to the exhaust gas duct after the separator cyclone 25 via a low load by-pass duct 26, by-passing the turbine stage 2N with a low load by-pass valve 27 open at low load.

In this manner, the approximately 10% of the nominal power remaining, which is used for low load operation with the fluidised bed combustion occurring at approximately atmospheric pressure, is converted in an optimum fashion into drive power for the compressor. The high pressure turbine transfers this additional power to the electrical machine 3, which is operating as a synchronous motor, via the clutch 4, which is designed as an overrunning clutch.

Figure 3:
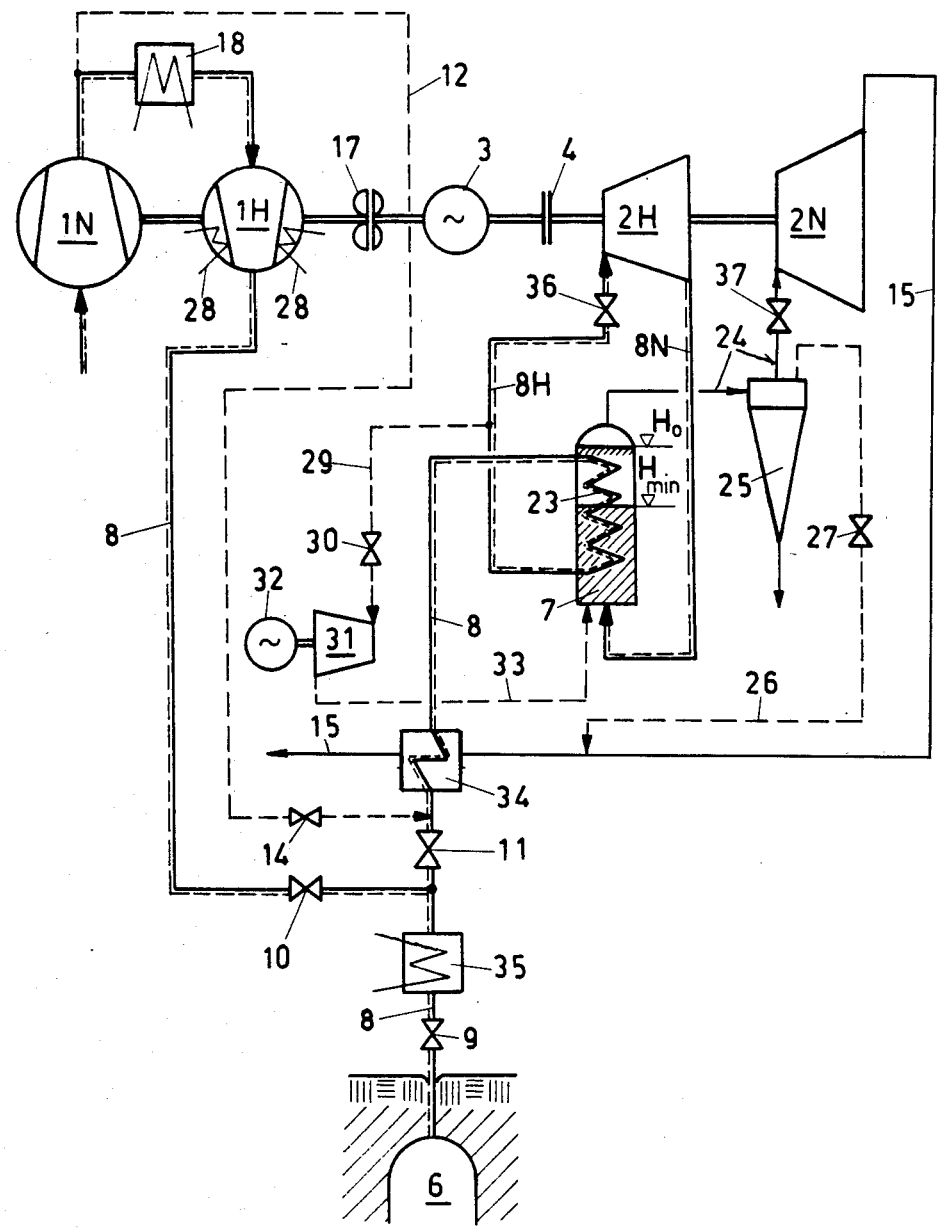
FIG. 3 is a third preferred embodiment of the present invention.

A further circuit embodiment for such low load operation of the fluidized bed firing during pumping operations is shown by the diagrammatically represented installation of FIG. 3. Where the elements of this figure are similar to those of the previously described installations, the same reference numbers are again allocated to them. The new elements in this embodiment include intercoolers 28 in the high pressure compressor stage 1H, a low load hot air duct 29, which branches off with a control unit 30 from the hot air duct 8H after the heater tube bundle 23 and leads to a low load turbine 31, which is connected to a generator 32. The outlet of the turbine 31 is connected to the fluidized bed combustion chamber 7 by a low pressure low load hot air duct 33. A recuperator 34 for preheating the combustion air for both turbine operation and low load operation is located in the main air duct 8. The primary side of this recuperator, which replaces the expensive regenerator 19-22 of FIG. 2 in this circuit variant, is located in the exhaust gas duct 15. A storage air cooler 35 is located before the shut-off unit 9 in the part of the main air duct 8 branching to the storage cavern 6. No clutch is provided between the two turbine stages 2H and 2N in this installation. They are rigidly coupled together.

During low load operation, low load air is again, as in the arrangement of FIG. 2, extracted behind the low pressure compressor stage 1N and led through the low load air duct 12 to the main air duct 8 with the shut-off unit 14 open. It then flows through the heater tube bundle 23 and subsequently, with the control unit 30 open, reaches the low load turbine 31, which drives the generator 32, reaching it at high temperature through the low load hot air duct 29. The electricity produced by the generator 32 is supplied to the grid or directly to the electrical machine 3.

The low load air, expanded in the low load turbine 31 to slightly above atmospheric pressure, passes via the low pressure low load hot air duct 33 into the fluidized bed combustion chamber 7 and leaves the fluidized bed as combustion gas via the combustion gas duct 24, the cyclone 25 and the low load by-pass duct 26, with the low load by-pass valve 27 open, and enters the exhaust gas duct 15. The two turbine stages 2H and 2N are brought to rest by the closure of the shut-off units 36 and 37, respectively, connected upstream of them. The turbines 2H+2N are separated from the electrical machine 3 by the disengagement of the clutch 4. The compressors 1N+1H are thus driven exclusively by the electrical machine acting as a motor.

The installation is a thermodynamic improvement on that of FIG. 2 in that the high pressure compressor stage 1H takes less power because of the intercooler 28. The compressor temperature which for this reason is still relatively low, is further reduced in the storage air cooler 35 before the storage air enters the cavern 6 so that a large weight of air can be stored in the cavern.

The combustion air for turbine operation and low load operation is preheated in the recuperator 34. The recuperator is too large for low load operation so that the combustion gases emerging through the exhaust gas duct 15 would be excessively cooled, should the low load air requiring preheat be too cold. The latter is, therefore, tapped off at the outlet of the low pressure compressor stage 1N before the intercooler 18, where the air is sufficiently warm to prevent the combustion gas temperature in the recuperator from dropping below the dew point.

A reduction in the low load fuel consumption is achieved by throttling the pressure before the low load turbine 31 to the point where the resulting decrease in the flow velocity in the fluidized bed reduces the height of the fluidised bed from a nominal value of $H_o$ to the smallest permissible value of $H_{min}$. In consequence, the combustion gas emerging at a temperature of approximately 850° C. from the fluidised bed obtains more cooling from the low load air passing in counterflow through the part of the heater tube bundle 23 now exposed further up; this has a favourable effect on the recuperator 34. The latter is subjected, by this means, to the same temperature level—permissible for ferritic steel—in low load operation as occurs during power operation, when it is subjected to the combustion gases expanded in the low pressure turbine stage 2N.

During longer operating pauses between pumping and power operation, the fluidized bed firing is maintained by the extraction of low load air from the storage cavern 6 with the shut-off unit 9 strongly throttled.

It is to be understood that the present invention may be embodied in other specific forms without departing from the spirit or essential characteristics of the present invention. The preferred embodiments are therefore to be considered illustrative and not restrictive. The scope of the invention is indicated by the appended claims rather than by the foregoing descriptions and all changes or variations which fall within the meaning and range of the claims are therefore intended to be embraced therein.

What is claimed is:

1. An air storage gas turbine power station with fluidized bed firing whose gas turbine group comprises a turbine, a compressor, an electrical machine which can be operated alternatively as a generator and an electric motor, a first clutch between the turbine and the electrical machine, a second clutch between the electrical machine and the compressor, an air storage chamber, a coal-fired fluidized bed combustion chamber, a combustion gas duct which communicates the fluidized bed combustion chamber with the turbine, a main air duct; and which communicates an outlet of the compressor with the air storage chamber and communicates both the air storage chamber and the outlet of the compressor with the fluidized bed combustion chamber, a first shut-off valve for selectively shutting-off the outlet of the compressor from said main air duct, a second shut-off valve for selectively shutting-off the air storage chamber from the main air duct, a throttle unit at a location along the main air duct upstream of the fluidized bed combustion chamber and a separator cyclone at a location along the combustion gas duct between the fluidized bed combustion chamber and the turbine, a low load air duct which communicates tapping means on the compressor with a section of the main air duct between the throttle unit and the fluidized bed combustion chamber and a third shut-off valve at a location along the low load air duct.

2. The air storage gas turbine power station according to claim 1, wherein the compressor has a low pressure compressor stage, a high pressure compressor stage and an intercooler operatively located between the low and high compressor stages and the turbine includes a high pressure turbine stage and a low pressure turbine stage, the second clutch including a mechanically lockable hydraulic torque convertor, a mechanical clutch operatively located between the high pressure turbine stage and the low pressure turbine stage, the tapping means located upstream of the intercooler of the compressor, the main air duct including a heater tube bundle, a high pressure hot air duct and a low pressure hot air duct, the heater tube bundle located in the fluidized bed combustion chamber and arranged so that air flows through the heater tube bundle in a direction opposite to a flow of the fluidized bed, the high pressure hot air duct communicating an outlet of the heater tube bundle with an inlet of the high pressure turbine stage, the low pressure hot air duct communicating an outlet of the high pressure turbine stage with an inlet to a lower region of the fluidized bed combustion chamber, the combustion gas duct communicating an outlet of the fluidized bed combustion chamber with an inlet of the low pressure turbine stage, a separator cyclone at a location along the combustion gas duct, a low load by-pass duct communicating an outlet of the separator cyclone with an exhaust gas duct of the low pressure turbine stage, a low load by-pass valve at a location along the low load by-pass duct, and a regenerator including a counterflow heat exchanger at a location along the main air duct opposite of the second shut-off valve from the air storage chamber, a hot water reservoir and pump means for circulating water from the hot water reservoir through the counterflow heat exchanger alternately in mutually opposed flow directions.

3. The air storage gas turbine power station according to claim 1, wherein the compressor has a low pressure compressor stage, a high pressure compressor stage and an intercooler operatively located between the low and high pressure compressor stages, and the turbine includes a high pressure stage and a low pressure turbine stage mounted on a common shaft, the second clutch including a mechanically lockable hydraulic torque convertor, the main air duct including a heater tube bundle, a high pressure hot air duct and a low pressure hot air duct, the heater tube bundle located in the fluidized bed combustion chamber and arranged so that air flows through the heater tube bundle in a direction opposite to a flow of the fluidized bed, the high pressure hot air duct communicating an outlet of the heater tube bundle with an inlet of the high pressure turbine stage, the low pressure hot air duct communicating the outlet of the high pressure turbine stage with an inlet to a lower region of the fluidized bed combustion chamber, the combustion gas duct communicating an outlet of the fluidized bed combustion chamber with an inlet of the low pressure turbine stage, a separator cyclone at a location along the combustion gas duct, a low load by-pass duct communicating an outlet of the separator cyclone with an exhaust gas duct of the low pressure turbine stage, a low load by-pass valve at a location along the low load by-pass duct, said gas turbine group further comprising intercoolers in the high pressure compressor stage, a low load turbine drivingly connected with a generator, a high pressure low load hot air duct communicating the high pressure hot air duct to an inlet of the low load turbine, a third control valve at a location along the high pressure low load hot air duct, a low pressure low load hot air duct communicating an outlet of the low load turbine with the lower region of the fluidized bed combustion chamber, a fourth shut-off valve at a location along the high pressure hot air duct, a fifth shut-off valve at a location along the combustion gas duct, a storage air cooler at a location along the main air duct opposite of the second shut-off valve from the air storage chamber and recuperator means for heating high pressure air in the main air duct with heat from the exhaust gas duct.

* * * * *